United States Patent [19]
Holmgren et al.

[11] 4,363,102
[45] Dec. 7, 1982

[54] SPEAKER IDENTIFICATION SYSTEM USING WORD RECOGNITION TEMPLATES

[75] Inventors: John E. Holmgren, Lincroft; Aaron E. Rosenberg, Berkeley Heights; John W. Upton, Chatham, all of N.J.

[73] Assignee: Bell Telephone Laboratories, Incorporated, Murray Hill, N.J.

[21] Appl. No.: 248,546

[22] Filed: Mar. 27, 1981

[51] Int. Cl.³ ............................................. G10L 1/00
[52] U.S. Cl. .................................. 364/513; 179/1 SB
[58] Field of Search ......................... 179/1 SB, 1 SD; 364/513; 340/146.3 WD, 146.3 AQ

[56] References Cited

U.S. PATENT DOCUMENTS

| | | | |
|---|---|---|---|
| 3,700,815 | 10/1972 | Doddington | 179/1 SB |
| 3,770,891 | 11/1973 | Kalfaian | 179/1 SB |
| 4,060,694 | 11/1977 | Suzuki | 179/1 SD |
| 4,092,493 | 5/1978 | Rabiner | 179/1 SD |
| 4,100,370 | 7/1978 | Suzuki | 179/1 SD |

Primary Examiner—Emanuel S. Kemeny
Attorney, Agent, or Firm—Jack S. Cubert

[57] ABSTRACT

In a speaker recognition and verification arrangement, acoustic feature templates are stored for predetermined reference words. Each template is a standardized set of acoustic features for one word, formed for example by averaging the values of acoustic features from a plurality of speakers. Responsive to the utterances of identified speakers, a set of signals representative of the correspondence of the identified speaker's features with said feature templates of said reference words is generated. An utterance of an unknown speaker is analyzed and the reference word sequence of the utterance is identified. A set of signals representative of the correspondence of the unknown speaker's utterance features and the stored templates for the recognized words is generated. The unknown speaker is identified jointly responsive to the correspondence signals of the identified speakers and unknown speaker.

17 Claims, 15 Drawing Figures

MINIMUM DETECTOR

PLA ARITHMETIC UNIT

SPEAKER IDENTIFICATION SYSTEM USING WORD RECOGNITION TEMPLATES

BACKGROUND OF THE INVENTION

Our invention relates to voice analysis and, more particularly, to speaker verification and identification arrangements.

It is often desirable to identify an individual or verify an asserted identity from voice characteristics. Commercial transactions conducted over telephone facilities are expedited when a party can be identified immediately without resorting to documents or prearranged codes. Similarly, controlled access to secured premises is facilitated by the use of voice identification techniques. Prior automatic speaker recognition systems have been based on the comparison of a predetermined spoken message with a previously stored reference of the same or similar message, or a comparison of selected speech parameters of particular utterances with stored parameters of a corresponding utterance. Combinations of pitch period, intensity, formant and other speech characteristics have been utilized for speaker recognition.

In one type of system such as disclosed in U.S. Pat. No. 3,466,394 issued to W. K. French on Sept. 9, 1969, selected peaks and valleys of successive pitch periods are used to obtain characteristic coordinates of the voiced input of an unknown speaker. These coordinates are selectively compared to previously stored reference coordinates. As a result of the comparison, a decision is made as to the identity of the unknown speaker. This arrangement as well as others relying on particular speech characteristics require that the characteristic coordinates be normalized to prevent errors due to variations in the individual's speech pattern.

Another type of arrangement, such as disclosed in U.S. Pat. No. 3,700,815 issued Oct. 24, 1972 to G. R. Doddington, et al and assigned to the same assignee, compares the characteristic way an individual utters a test sentence with a previously stored utterance of the same sentence. The comparison is restricted to a prescribed sentence and requires that the two utterances be temporally aligned by time warping so that a valid comparison may be made.

U.S. Pat. No. 4,032,711 issued on June 28, 1977 to M. R. Sambur and assigned to the same assignee, discloses an arrangement in which each utterance is filtered to obtain parameters that are highly indicative of the individual but are independent of the content of the utterance. Consequently, it is no longer required to compare utterances of the same phrase for speaker recognition. The statistical parameters that are utilized, however, are not useful for recognition of the contents of the utterance.

U.S. Pat. No. 4,181,821 is issued to Frank C. Pirz and Lawrence R. Rabiner, Jan. 1, 1980 and assigned to the same assignee discloses a word recognition system in which speech patterns of many individuals are clustered to derive a small number of templates for each word. The set of templates are representative of the general population so that the utterances from a broad range of any individuals can be recognized. The linear prediction template parameters utilized for speaker-independent recognition are adapted to recognize the information in speech patterns applied thereto. In many applications, it is important to simultaneously determine both the speaker and the utterance that is spoken. In telephone credit card transactions, for example, identification of the speaker on the basis of his voice characteristics assures that the transaction being recognized by an automatic word analyzer is properly authorized. The concurrent use of the same speaker independent speech parameters for word recognition and speaker identification or verification improves the service rendered and makes the speaker recognition more economical. It is an object of the invention to provide improved speaker recognition in combination with spoken word analysis systems.

BRIEF SUMMARY OF THE INVENTION

The invention is directed to a speaker recognition arrangement in which a plurality of templates representative of utterances of a prescribed reference word are stored. Jointly responsive to the utterances of each reference word by an identified speaker and the stored templates for the reference word, a set of signals characteristic of the identified speaker are produced. An utterance of an unknown speaker is analyzed and the utterance is identified as one or more reference words. Signals characteristic of the unknown speaker are generated responsive to the unknown speaker's utterance and the stored templates of the identified reference words. The signals characteristic of the unknown speaker are compared to the signals characteristic of the identified speakers for the recognized reference words to select an indentity for the unknown speaker.

GENERAL DESCRIPTION

Figure 1:
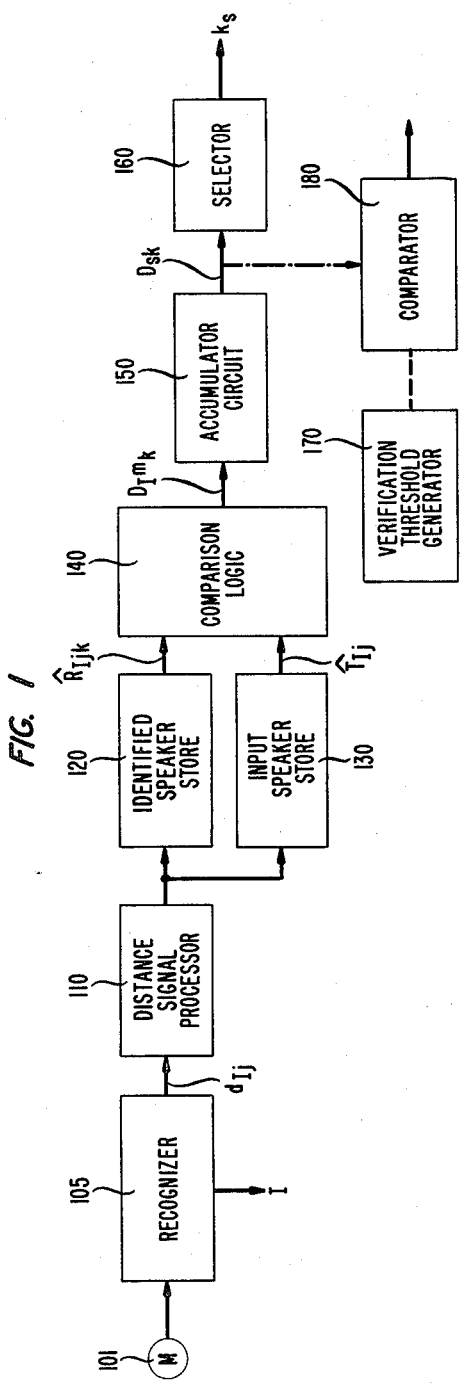
FIG. 1 depicts a general block diagram of a speaker recognizer illustrative of the invention.

FIG. 1 shows a general block diagram of a speaker recognition arrangement illustrative of the invention. Recognizer 105 is adapted to receive a speech signal from electroacoustic transducer 101 and to identify the speech signal as one or more words. Recognizer 105 may comprise the recognition system disclosed in U.S. Pat. No. 4,181,821 issued to F. C. Pirz and L. R. Rabiner Jan. 1, 1980 and assigned to the same assignee or similar arrangement utilizing multiple templates for each reference word. As described in U.S. Pat. No. 4,181,821, the feature signals of many utterances of each reference word by a large number of speakers are clustered into groups. A reference word template is generated for each group. The multiple templates can then be utilized to recognize the utterances of speakers from the general population by comparing the group representative template feature signals to those of any speaker. During the recognition process, a signal representative of the correspondence between the features of each group representative template and the speaker utterance features is generated for every reference word. Clustering arrangements for word recognition are described in the article "Speaker Independent Recognition of Isolated Words Using Clustering Techniques" by L. R. Rabiner, S. E. Levinson, A. E. Rosenberg, and J. G. Wilpon, *IEEE Transactions on Acoustics, Speech and Signal Processing*, Vol. ASSP-27, No. 4, pp. 236-249, August, 1979.

Each recognition template in recognizer 105 is characteristic of a distinct group of speakers with similar speech patterns for a word. We have found that the distribution of the correspondence signals is consistent for individual speakers and varies characteristically from speaker to speaker. In accordance with the invention, the same speech correspondence signals obtained from recognition of the content of the speech pattern are used concurrently to recognize the speaker. In the recognition arrangement of U.S. Pat. No. 4,181,821, the acoustic features are linear prediction parameters and the correspondence signals represent the distances between vectors generated from the linear production parameters on a frame sequence basis. The utilization of linear prediction parameters in speech recognition by distance processing is described in the article "Minimum Prediction Residual Principle Applied to Speech Recognition" by F. Itakura, *IEEE Transactions on Acoustics, Speech and Signal Processing*, Vol. ASSP-23, pp. 57-72, February, 1975 and the article "Considerations in Dynamic Time Warping for Discrete Word Recognition" by L. R. Rabiner, A. E. Rosenberg, and S. E. Levinson, *IEEE Transactions On Acoustics, Speech and Signal Processing*, Vol. ASSP-26, No. 6, pp. 575-582, December, 1978. It is to be understood, however, that spectral, formant or other speech parameters may be used.

Recognizer 105 provides a signal I which identifies the word corresponding to the utterance and a set of signals $d_{Ij}$ representative of the distance between the $j^{th}$ stored template vector ($j=1,2,\ldots J$) for the word I and the speech feature vector corresponding to the spoken utterance. The J distance signals are supplied to distance signal processor 110 which is operative to normalize and quantize the distance signals. The normalization includes selecting the minimum distance signal $d_{Ijmin}$ of the $d_{I1}, d_{I2}, \ldots, d_{Ij}, \ldots, d_{IJ}$ signals and forming a set of normalized signals $$d'_{Ij} = d_{Ij} - d_{Ijmin} \tag{1}$$

The resulting normalized signals are representative of the vector distances with biases removed. The normalized signals $d'_{Ij}$ are then quantized into approximately equally populated groups in accordance with $0, 0 \leq d'_{Ij} < 0.1$ $1, 0.1 \leq d'_{Ij} < 0.2$ $X_{Ij} = 2, 0.2 \leq d'_{Ij} < 0.3 \tag{2}$ $3, 0.3 \leq d'_{Ij} < 0.4$ $4, 0.4 \leq d'_{Ij}$ The outputs of distance processor 110, $X_{I1}, X_{I2}, \ldots X_{IJ}$, are representative of the correspondence between the speaker's utterance of word I and the J group representative templates for the reference word I stored in recognizer 105.

Initially recognizer 105 is used in a training mode to generate reference signals $R_{Ijk}$ characteristic of the speakers who will use the system. Each identified speaker $1 \leq k \leq K$ utters the reference words into transducer 101. Th $d_{Ijk}$ distance signals from the recognizer are transformed by distance signal processor 110 into reference signals $\hat{R}_{Ijk}$ which reference signals are stored in identified speaker characteristics store 120. Store 120 then contains a set of signals $\hat{R}_{I1k}, \hat{R}_{I2k}, \ldots \hat{R}_{IJk}$ for each reference word I spoken by speaker k. $\hat{R}_{Ijk}$ signals for additional speakers may be added and the $\hat{R}_{Ijk}$ characteristic for any speaker may be deleted or revised at a later time.

When the circuit of FIG. 1 is used to identify a speaker, the speaker's utterance is recognized as a series of words $I^1, I^2, \ldots I^m, \ldots I^M$. For each word $I^m$, distance processor 110 transforms the $d_{Imj}$ signals from recognizer 105 into quantized normalized signals $T_{Im1}, T_{Im2}, \ldots T_{ImJ}$. The output sequence from distance processor 110 is then inserted into input speaker characteristics store 130. The reference signals for the first speaker (k=1) in identified speaker characteristics store 130 are then retrieved and sequentially applied to one input of comparison logic 140. Similarly, the input speaker signals in store 130 are applied to the other input of comparison logic 140. Logic circuit 140 is adapted to form the distance signal $$D_{Imk} = \sum_{j=1}^{J} |T_{Imj} - R_{Imj1}| \tag{3}$$

which is a measure of the correspondence between the unknown speaker's characteristics and the first identified speaker's characteristics based on the stored templates for word $I^m$. The overall correspondence signal $$D_{s1} = \sum_{m=1}^{M} D_{Imj} \tag{4}$$

for the first identified speaker is accumulated in arithmetic circuit 150 and stored in selector circuit 160 along with the speaker identification signal k=1. The comparison process is then repeated to obtain overall distance signal $D_{s2}$ for identified speaker k=2. Signal $D_{s2}$ is compared to signal $D_{s1}$ in selector 160 which stores the smaller overall distance signal and the speaker identification signal corresponding thereto. In general, comparator logic 140 forms a distance signal.

$$D_{Imk} = \sum_{j=1}^{J} |T_{Imj} - R_{Imjk}| \tag{5}$$

for each speaker. The overall distance signal for speaker k $$D_{sk} = \sum_{m=1}^{M} D_{Imk} \qquad m = 1, 2, \ldots, M \qquad (6)$$

is accumulated in circuit 150. The minimum of the $D_{sk}$ signals for $k=1,2,\ldots K$ as well as the corresponding speaker identification signal k are stored in selector 160 after the comparison operations for the last speaker (K) are completed.

The circuit of FIG. 1 may also be modified to verify the identity asserted by a speaker. For verification, only the asserted identity (k) locations of identified speaker characteristics store 120 for the recognized word series $I^1, I^2, \ldots I^m$ are addressed after the input speaker characteristics $T_{Im1}, T_{Im2}, \ldots T_{ImJ}$ are inserted into input speaker characteristics store 130. The overall distance signal $D_{sk}$ for speaker k is accumulated in circuit 150. A verification threshold signal is produced in threshold circuit 170 as is well known in the art. The $D_{sk}$ signal from arithmetic circuit 150 is then compared to the verification threshold signal TH in comparator 180. The verified identity signal is obtained from comparator 180 only if $D_{sk} \leq TH$.

Speaker recognition threshold principles are described in the articles "Evaluation of an Automatic Speaker Verification Over Telephone Lines" by A. E. Rosenberg, *Bell System Technical Journal*, Vol. 55, pp. 723–744, July-August 1976 and "Speaker Recognition by Computer" by E. Bunge, *Phillips Technical Review*, Vol. 37, No. 8, pp. 207–219, 1977.

DETAILED DESCRIPTION

Figure 2:
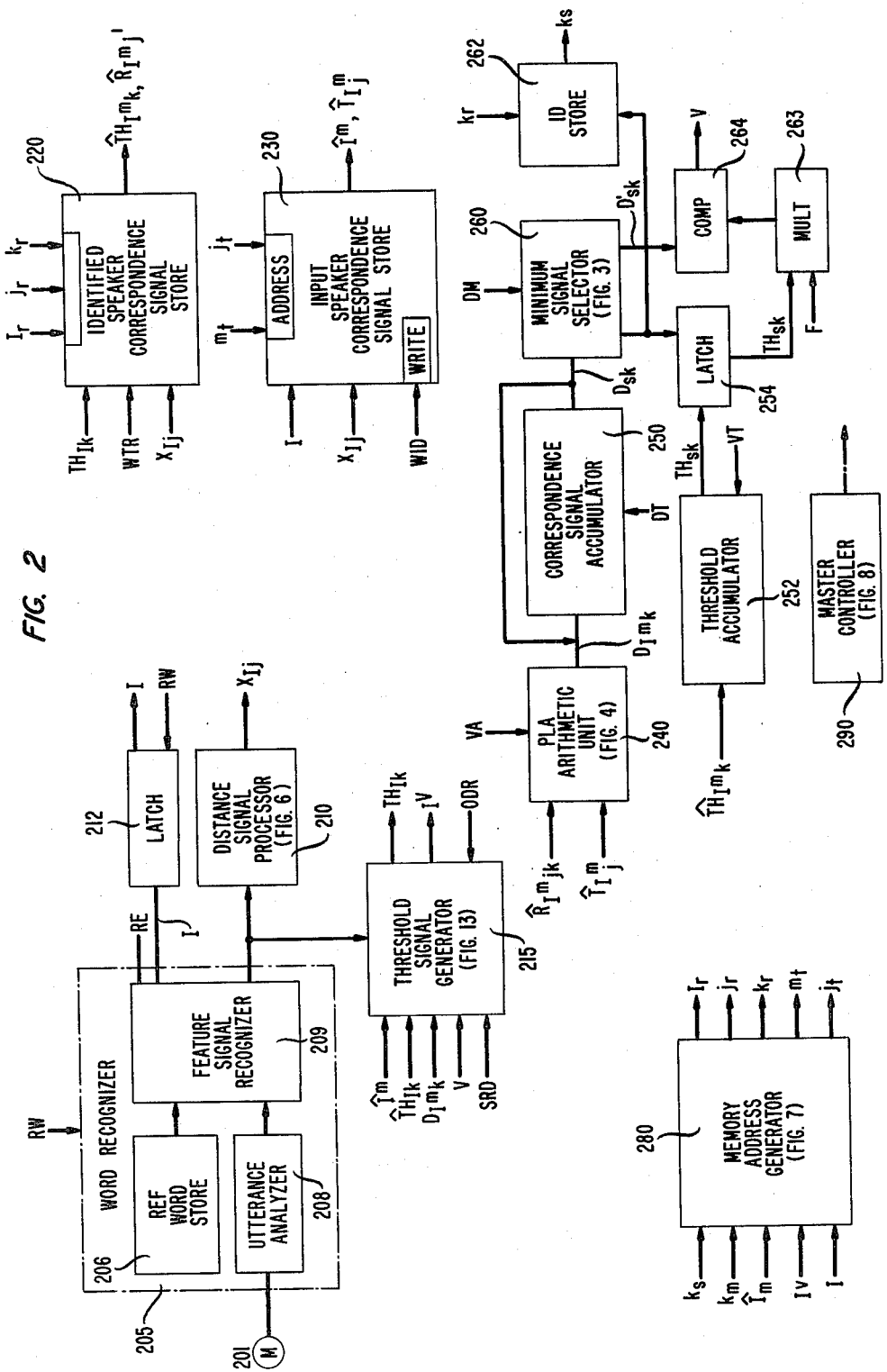
FIG. 2 depicts a detailed block diagram of a speaker identification circuit illustrative of the invention.

FIG. 2 shows a detailed block diagram of a speaker recognizer illustrative of the invention. Word recognizer 205 includes utterance analyzer and utterance feature signal store 208, reference word template store 206 and feature signal processor 209. Template store 206 includes J templates for each reference word in the recognition vocabulary. Each template is representative of linear prediction acoustic features of utterances of the reference word by a distinct group of speakers. The template is obtained by clustering a large number of utterance feature signals from a general population. The clustering provides a small number of templates that may be used in speaker independent recognition. For purposes of illustration, it is assumed that the reference word set is limited to the digits 0 through 9 and that 12 distinct group templates $j=1,2,\ldots,12$ are stored for each digit.

Utterance analyzer 208 receives a speech signal from microphone 201 that corresponds to a sequence of M a (e.g. 9) digits. The analyzer converts the speech signal into linear prediction acoustic features which are stored therein. Feature signal recognizer 209 is adapted to compare the feature signals of each successive word from analyzer 208 to the templates from template store 206. For each reference word, the utterance features are compared with the $1 \leq j \leq 12$ templates. After all templates of every reference word are compared to the utterance, feature signal recognizer provides a digit identification signal I. I corresponds to the reference word having one or more group templates that closely match the word feature signals of the input speaker.

When each reference word template set is processed, a set of distance signals $d_{i1}, d_{i2}, \ldots d_{ij}, \ldots d_{i,12}$ are generated. Signal $d_{ij}$ is representative of the overall correspondence of the input word feature signals from analyzer 208 to the feature signals of template j for reference word i. Signal $d_{ij}$ is the distance between the vector of input word feature signals and the vector of the $j^{th}$ template feature signals for word i as is well known in the art.

The recognized word identification signal I obtained from feature signal recognizer 209 is placed in latch 212. The sequence of distance signals $d_{I1}, d_{I2}, \ldots d_{Ij}, \ldots d_{I,12}$ for the recognized digit I are sequentially supplied to distance signal processor 210 shown in greater detail in FIG. 6. Processor 210 is operative to transform the recognized word distance signals into a set of quantized normalized signals $X_{I1}, X_{I2}, \ldots X_{IJ}, \ldots X_{I,12}$. Each signal $X_{IJ}$ represents the correspondence between the utterance of the input speaker to a distinct group template.

The speaker recognition circuit of FIG. 2 is operative in both a training mode and an identification mode. During the training mode, the distance signal processor receives the distance signals of several utterances of an indentified word I by an identified speaker and provides a set of quantized normalized signals $X_{IJ}$ representative of the average correspondence of the identified speaker's feature signals to the template feature signals of word I. An acceptance threshold signal $TH_{Ik}$ is also developed which is indicative of the acceptable variations of the quantized normalized correspondence signals for word I spoken by identified speaker k. In the identification mode, an unknown speaker's distance signals for the identified word are normalized and quantized to provide correspondence signals representative of his speech. The unknown speaker's correspondence signals are stored and compared to the correspondence signals of the identified speaker.

In order to provide a set of reference correspondence signals for comparison with speakers to be recognized, the circuit of FIG. 2 is set to its training mode in which each speaker repeats each reference word n, e.g. five, times. The train mode is initiated by the generation of signal TR in controller 290.

Each of controllers 803, 805, and 807 is a microcomputer such as described in the article "Let a Bipolar Processor Do Your Control and Take Advantage of Its High Speed" by Steven Y. Lau appearing in *Electronic Design*, 4, Feb. 15, 1979 on pages 128–139. As is well known in the art, a controller of this type produces a sequence of selected output signals responsive to the states of the input signals applied thereto. Each control circuit incorporates a read only memory containing a permanently stored instruction set adapted to provide the control signal sequence therefrom. The instructions for the controllers are shown in FORTRAN language in Appendix A.

Figure 7:
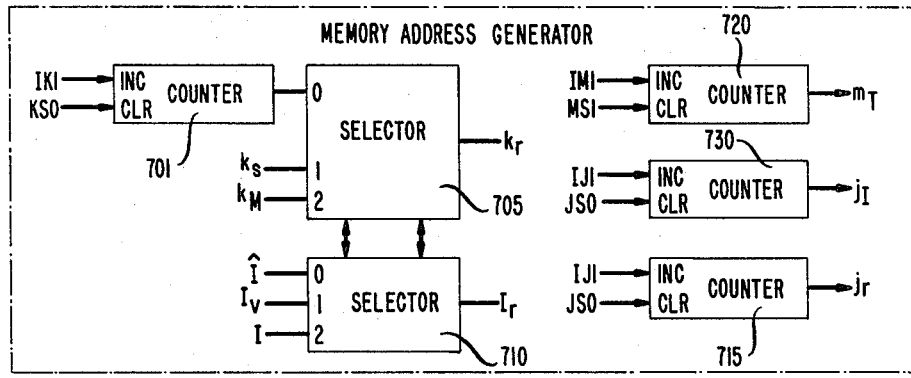
FIG. 7 shows a more detailed block diagram of the memory address circuit of FIG. 2.
Figure 8:
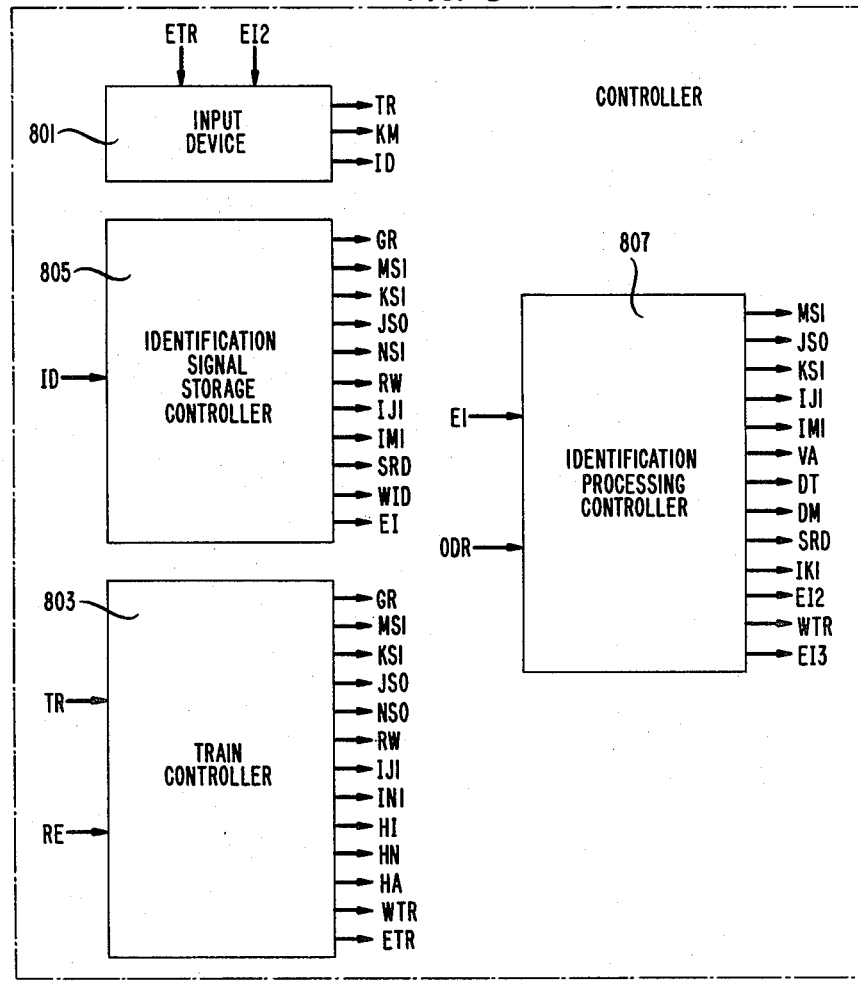
FIG. 8 shows a more detailed block diagram of the controller of FIG. 2.
Figure 9:
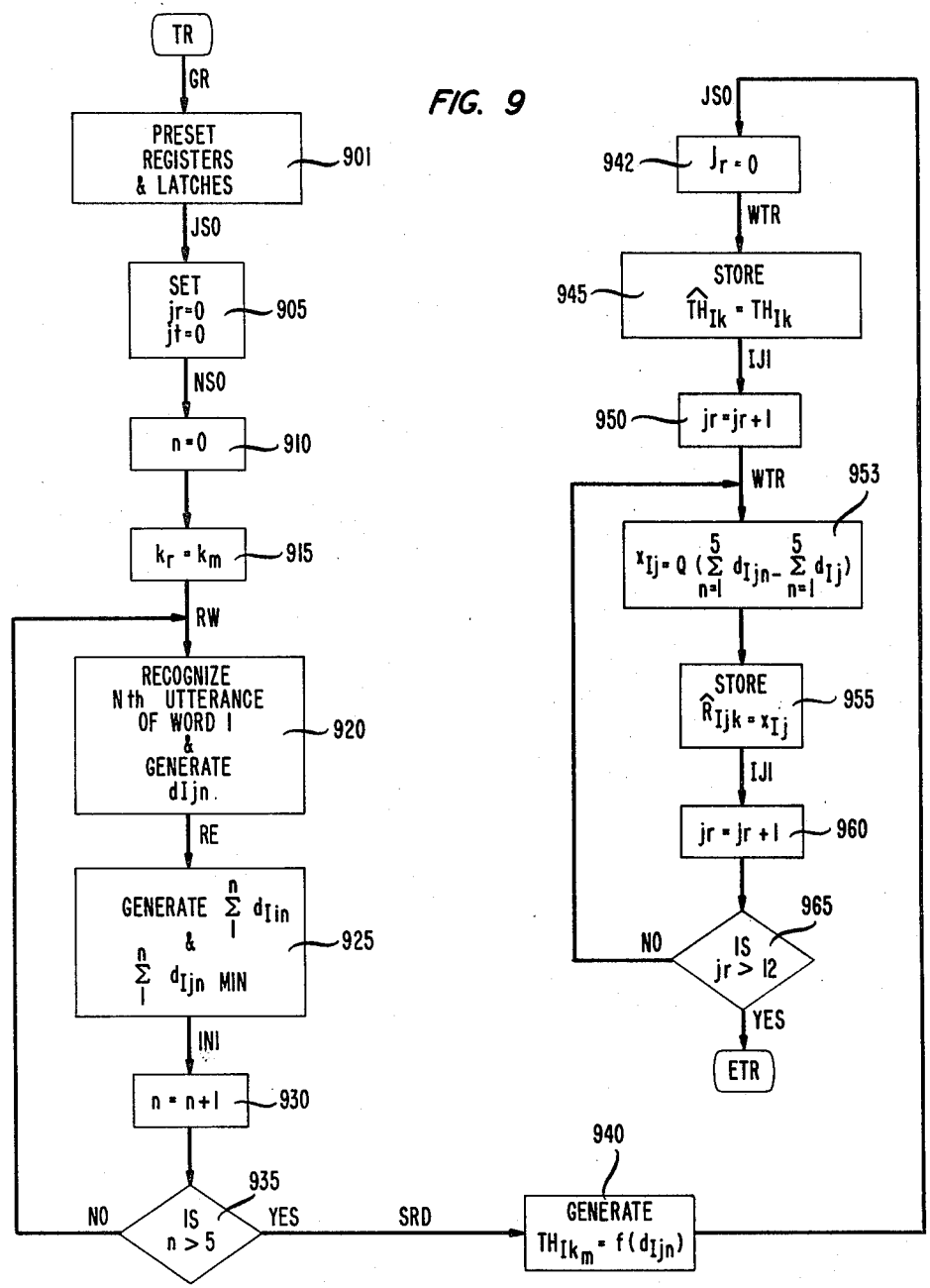

Referring to FIG. 8 which shows the controller in greater detail, input device 801 provides signal TR responsive to a manual command. Device 801 may comprise a keyboard encoder or other arrangement. When the circuit of FIG. 2 is placed in the train mode, signal TR identifying the mode, signal $k_M$ identifying the speaker are produced. FIG. 9 shows a flow diagram illustrating the training mode process. The TR signal initiates the operation of train controller 803 which first produces signals GR, JSO, and NSO. Signal GR presets the shift registers and latches of FIG. 2 to their initial states as per box 901 in FIG. 9. Signal JSO resets counters 715 and 730 in FIG. 7 to their zero states as indicated in index setting box 905 and signal NSO resets counter 501 in the quantizer circuit of FIG. 5 to its zero state (index setting box 910). Speaker identification signal $k_r$ is set to $k_M$ by input device 801 (index box 915). Signal RW is then produced by controller 803 to enable recognizer 205 in FIG. 2 as per operation box 920.

Figure 3:
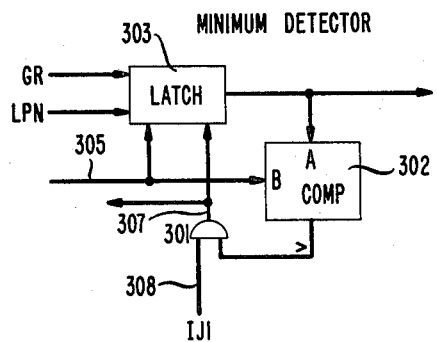
FIG. 3 shows a detailed block diagram of a minimum detector current useful in the circuit of FIG. 2.
Figure 4:
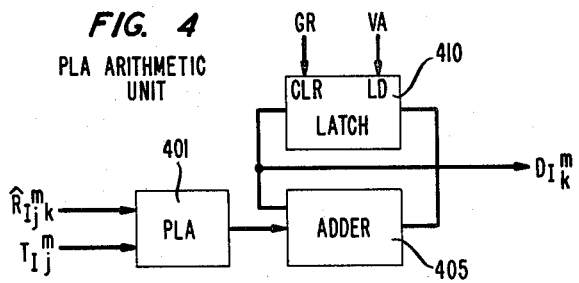
FIG. 4 shows a more detailed block diagram of the PLA arithmetic circuit of FIG. 2.
Figure 6:
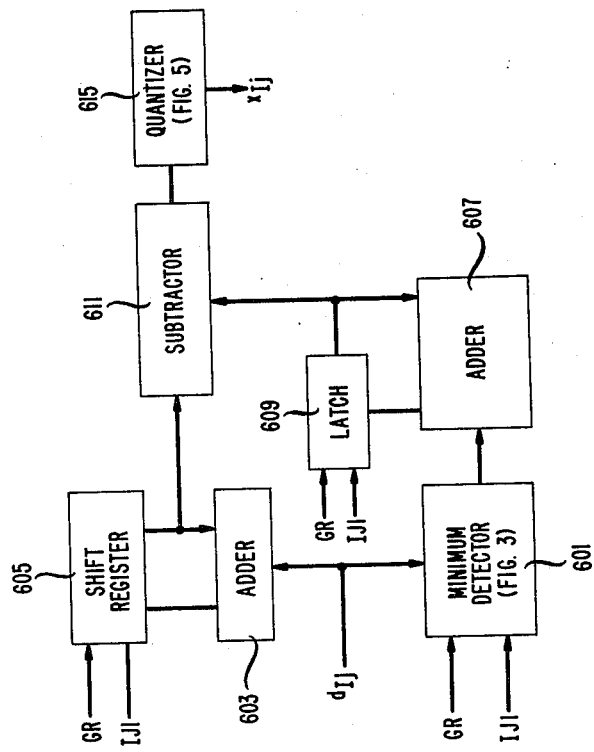
FIG. 6 shows a more detailed block diagram of the distance processor of FIG. 2.

As a result of the operation of word recognizer 205, five sets of distance signals are sequentially supplied to distance signal processor 210 shown in detail in FIG. 6 and the identified word I is placed in latch 212. Upon completion of the recognition operation, recognizer 205 sends signal RE to controller 803. Distance processor 210 is then adapted to normalize and quantize the distance signals in accordance with Equations 1 and 2 by controller 803. Referring to FIG. 6, and $d_{ij}$ distance signals are supplied to one input of Adder 603 and the input of minimum detector 601. Minimum detector 601 shown in detail in FIG. 3 is operative to select the minimum distance signal of each set ($d_{Ijmin}$) which minimum is applied to Adder 607. Latch 609 is initially cleared to zero by control signal GR and the combination of Adder 607 and latch 609 functions as an accumulator which forms the signal $$\sum_{n=1}^{5} d_{Ijnmin}$$

representative of the sum of the five minimum distance signals responsive to the succession of shift pulses IJ1 from controller 803 (operation box 925).

Referring to FIG. 3, latch 303 is preset to the largest possible code LPN by control signal GR prior to the minimum detector operation. The input signal is applied to the B input of comparator 302 via line 305. The output of latch 303 is supplied to the A input of comparator 302. The B<A output of the comparator is enabled only if the B input signal is smaller in value than the A input signal from latch 303. AND-gate 301 provides an enabling output on line 307 when the B<A output of comparator 302 is enabled concurrently with each successive control signal IJ1 on line 308. Responsive to the enabled output of gate 301, the signal on line 305 is inserted into latch 303. After a sequence of input signals to comparator 302, the minimum valued input signal is stored in latch 303.

Register 605 comprises 12 stages, one for each successive distance signal of a set. The shift register is initially cleared to zero by signal GR. Adder 603 and shift register 605 function as an accumulator for each of the 12 distance signals of the sets. Responsive to the first set of distance signals shift register 605 contains the succession of signals $d_{I11}$, $d_{I12}$, ..., $d_{I1,12}$. Each successive distance signal set is then added to the sums for the previous sets in register 605. After the fifth set is applied to Adder 603, shift register 605 contains the set of signals $$\sum_{n=1}^{5} d_{I1n}, \sum_{n=1}^{5} d_{I2n}, \ldots, \sum_{n=1}^{5} d_{Ijn}, \ldots, \sum_{n=1}^{5} d_{I,12n}. \quad (7)$$

The summing operation is indicated in operation box 925.

Figure 13:
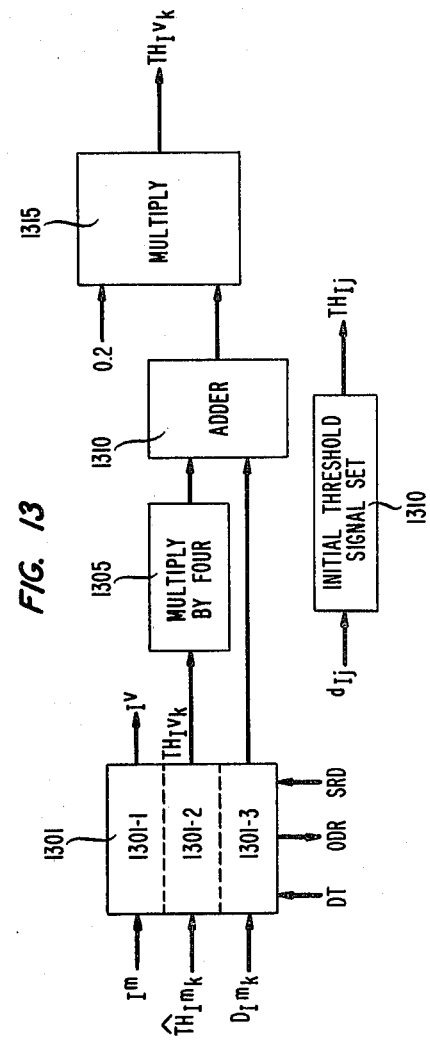
FIG. 13 shows a more detailed block diagram of the threshold generator circuit of FIG. 2.

When each distance signal set is processed, counter 501 is incremented by control signal IN1 as per index box 930. Subsequent to the formation of the 12 summed signals of Equation 7 in decision box 935, signals HN, HI, and HA are obtained from controller 803 and the $d_{ij}$ distance signals from word recognizer 205 are supplied to threshold signal generator 215 shown in detail in FIG. 13 (operation box 940). After the threshold signal $TH_{Ik}$ is formed, signal JSO resets counter 715 (operation box 942) and the threshold signal is inserted into store 220 (operation box 945). The threshold signal generator develops a threshold signal $TH_{Ik}$ representative of the range of distance signals for valid identifications. The threshold range signal is a function of the statistical distribution of the distance signals from recognizer 205 or may be precalculated and stored in initial threshold store 1310.

The summed minimum signal $$\sum_{n=1}^{5} d_{Ijnmin}$$

in latch 609 is subtracted from each successive output of shift register 605 in subtractor 611. The output of subtractor 611 is proportional to the normalized distance signals $d'_{ij}$ of Equation 1. The 12 successive outputs of subtractor 611 are then applied to the input of quantizer 615 to form the $X_{Ij}$ signals as indicated in the loop including operation box 953 and 955, index box 960 and decision box 965. Quantizer 615 is shown in detail in FIG. 5.

Figure 5:
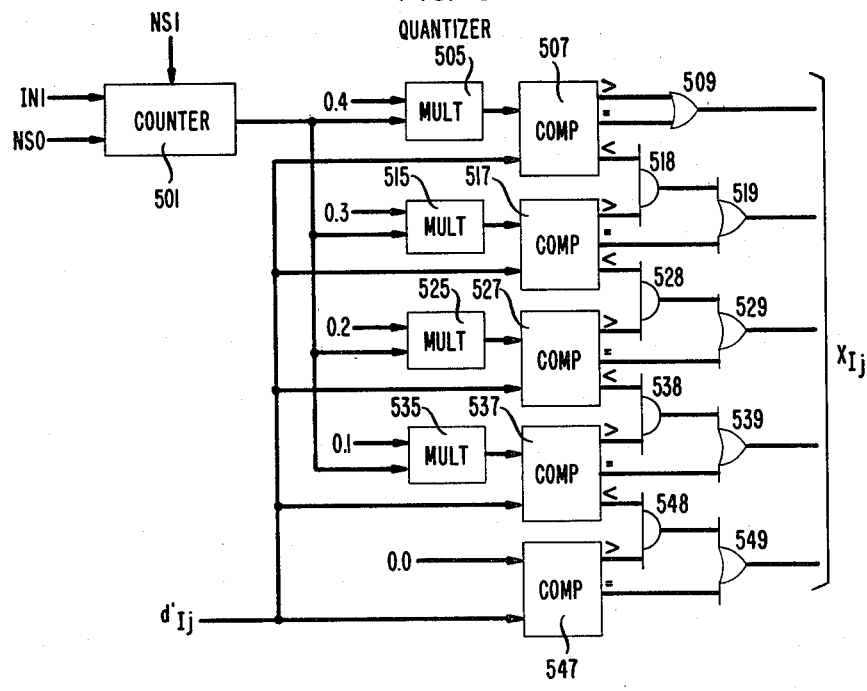
FIG. 5 shows a detailed block diagram of a quantizer circuit useful in the distance processor of FIG. 2.

Referring to FIG. 5 each normalized summed signal is supplied to the inputs of comparator 507, 517, 527, 537, and 547. Counter 501 was incremented for each set of distance signals by signal NS1 (index box 935) and its output is five corresponding to the five repetitions of the reference word I. The "five" signal is transferred to the inputs of multiplier 505, 515, 525, and 535. The outputs of multipliers 505, 515, 525, and 535 are 2.0, 1.5, 1.0, and 0.5 respectively. As a result of the operation of comparators 507, 517, 527, 537, and 547, a five bit coded signal $X_{ij}$ is obtained from the outputs of OR-gates 509, 519, 529, 539, and 549 (operation box 953). In this way each signal $$\sum_{n=1}^{5} d_{Ijn} - \sum_{n=1}^{5} d_{Ijnmin}$$

is classified into one of five groups. If signal $$\sum_{n=1}^{5} d_{Ijn} - \sum_{n=1}^{5} d_{Ijnmin}$$

is greater than or equal to 2.0, the greater than or equal output of comparator 507 is enabled and $X_{Ij}=10000$. For the signal on line 560 greater than 1.5 and less than 2.0, the less than output of comparator 507 and the greater than output of comparator 517 are enabled whereby $X_{Ij}$ is set at 01000. The same $X_{Ij}$ code is obtained if the signal on line 560 equals 1.5 since the equal output of comparator 517 is enabled. Similarly, $X_{Ij}$ is 00100 if the signal on line 560 is equal to or greater than 1.0 but less than 1.5. $X_{Ij}$ is 00010 for the signal on line 560 equal to or greater than 0.5 but less than 1.5. $X_{Ij}$ is 00001 when the signal on line 560 is equal to or greater than 0.0 but less than 0.5. The sequence of signals $X_{I1}$, $X_{12}$, ... $X_{Ij}$ ... $X_{I,12}$ from the quantizer of FIG. 5 represent the correspondence between the $k_M$ identified speaker's utterance and the 12 templates for the identified word I stored in reference word template store 206.

Identified speaker correspondence signal store 220 is adapted to store the $X_{Ij}$ and $TH_{Ik}$ outputs of distance signal processor 210 and threshold signal generator 215 for every identified word and every speaker. Memory address generator 280 shown in detail in FIG. 7 supplied the address signals needed to store the $X_{Ij}$ correspondence signals and the $TH_{Ik}$ threshold signal obtained from the utterance of each identified word by a speaker k.

Referring to FIG. 7, store 220 is addressed by the $k_r$ output of selector 705, the $I_r$ output of selector 710 and the $j_r$ output of counter 715. In the training mode, a path is established between the $k_m$ input and the output of selector 705 responsive to signal TR. Signal TR causes the I input of selector 710 to be connected to its $I_r$ output. Thus, signal I corresponding to the identified word is supplied to one address input of store 220. Signal $k_M$ corresponding to the speaker identity is supplied to another address input of store 220.

When counter 715 is in its zero state after being cleared by control signal JSO (operation box 942), the $TH_{Ik}$ signal from threshold signal generator 215 is inserted into the $I, k_M, j_r=0$ location of store 220 by write pulse WTR from training control 803 (operation box 945). Counter 715 is successively incremented by signal IJ1 (operation box 950). The $X_{Ij}$ outputs of distance signal processor 210 are then inserted into store 220 by signals IJ1 from controller 803. The distance signals are thereby successively inserted into the $I, k_M$ locations of store 220 by the write pulses WTR. The insertion of $X_{Ij}$ pulses follows the loop including operation boxes 953 and 955, index box 960, and decision box 965.

Upon termination of the storage of correspondence signals for identified word I of speaker $k_M$, the circuit of FIG. 2 is reset to its initial state by signal ETR from controller 803 so that correspondence signals for additional words can be obtained from the same speaker or from other speakers of the identified speaker set. The training is completed when store 220 contains a set of correspondence signals and a threshold signal for every reference word spoken by each identified speaker.

The recognizer of FIG. 2 may be switched into its identification mode after a sufficient number of identified speaker correspondence and threshold signals have been placed in store 220. In the identification mode, an unknown speaker utters a sequence of reference words such as a personal identification number.

Figure 10:
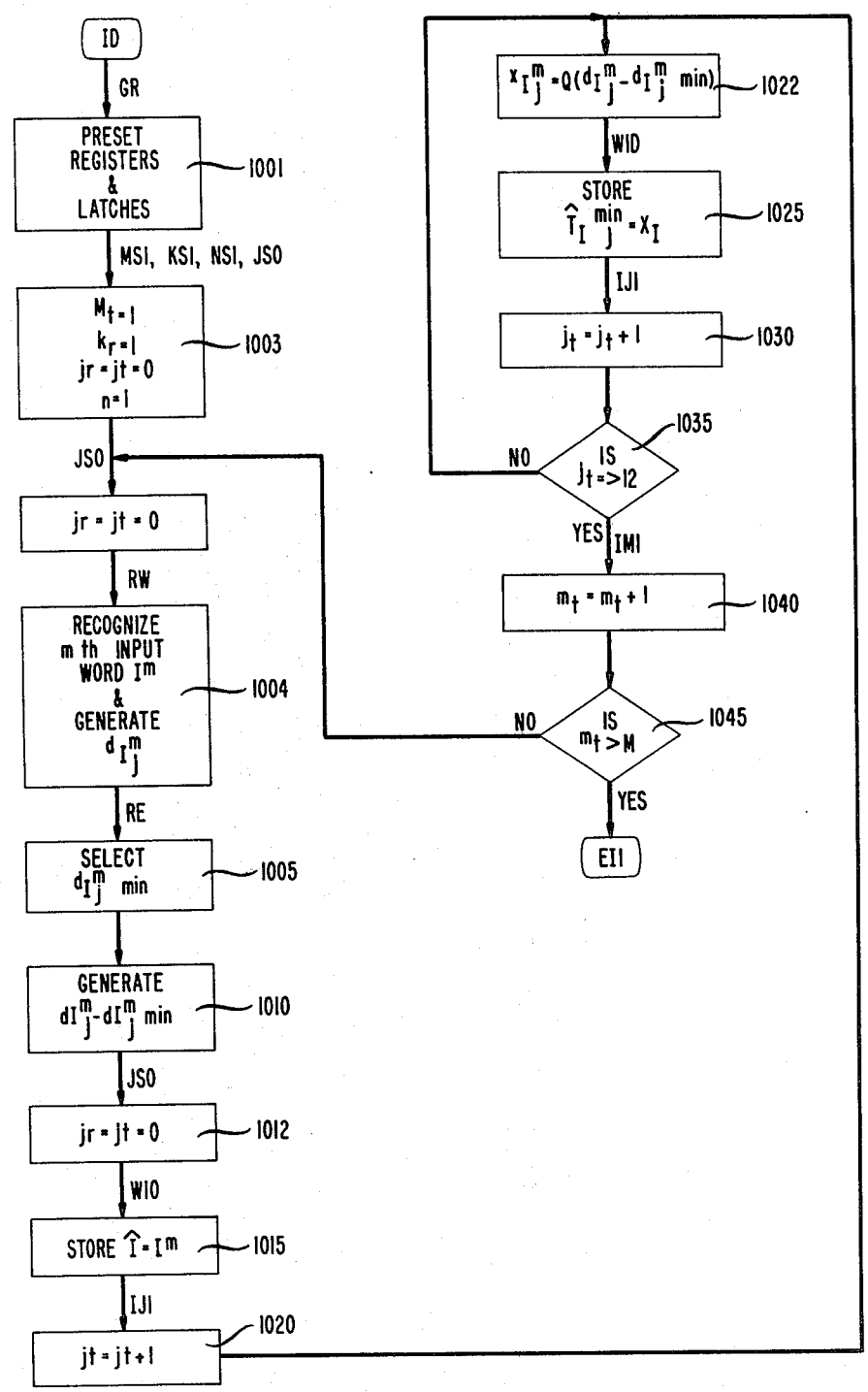

The identification mode is started by the generation of signal ID in input device 801 of FIG. 8. When the circuit of FIG. 2 is placed in the identification mode, signal ID initiates the operation of identification signal storage controller 805. Controller 805 first produces signals GR, MS1, JSO, KS1, and NS1. Signal GR presets the registers and latches of FIG. 2 to their initial states as per box 1001 in the flow diagram of FIG. 10. Control signal MS1 sets counter 720 to its $m_t=1$ state. Control signal JSO sets counters 715 and 730 to their zero states. Control signal KS1 sets counter 701 to its $k_r=1$ state and control signal NS1 sets counter 501 to its $n=1$ state. Signal RW is then applied to recognizer 205 to initiate the recognition of the utterance of the unknown speaker. Responsive to the speech signal of the unknown speaker from microphone 201, utterance analyzer 208 generates and stores the feature signals for the successive digits. Each successive digit is recognized in feature signal recognizer 209 which recognizer provides recognized word identification signals $I^1, I^2, \ldots$ $I^M$ and a set of distance signals $d_{Ij}$ representative of the distance between the reference word templates for recognized words I and the feature signals of the unknown speaker as per operation box 1004. The single set of distance signals $d_{Ij}$ for each reference word is supplied to the inputs of distance signal processor 210 and threshold signal generator 215.

In the distance signal processor, minimum detector 601 is operative to determine the $d_{Ijmin}$ code from the single set of 12 distance signals as described with respect to the training mode (operation box 1005). The $d_{Ijmin}$ code is placed in latch 609. Shift register 605 is initially cleared by control signal GR and the succession of distance signals $d_{I1}, d_{I2}, \ldots d_{Ij}, \ldots d_{I,12}$ is transferred into the shift register via Adder 603. As each successive $d_{Ij}$ signal appears at the output of the shift register, subtractor 611 is operative to form the difference signal of Equation 1 (operation box 1010).

The normalized distance signals $d'_{Ij}$ for the unknown speaker from subtractor 611 are successively supplied to quantizer 615 in which the $X_{Ij}$ correspondence signals are formed (operation box 1022). Referring to FIG. 5, counter 501 was placed in its first state responsive to control signal NS1. Consequently, the outputs of multipliers 505, 515, 525, and 535 are 0.4, 0.3, 0.2 and 0.1, respectively. Comparators 507, 517, 527, 537, and 547 are operative to form an $X_{Ij}$ code for each normalized distance signal applied thereto. As aforementioned with respect to the training mode, each successive normalized distance signal is assigned to a group for which there is a unique quantized code $X_{Ij}$.

The $X_{Ij}$ correspondence signals from distance processor 210 relating the unknown speaker's features to the reference templates for the identified word I are supplied to input speaker correspondence store 230 together with the word identification signal I.

Store 230 is addressed by signals $m_t$ and $j_t$. Signal $m_t$ identifies the position of the identified word I in the word sequence $I^1, I^2, \ldots, I^M$ of the unknown speaker's utterance and signal $j_t$ determines the successive locations for the $X_{I1}, X_{I2}, \ldots X_{Ij}, \ldots X_{I,12}$ correspondence signals from processor 210. Store 230 is addressed by memory address generator 280. Referring to FIG. 7, counter 720 was initially cleared to its first state by signal MS1 and is incremented upon the identification of each successive word by recognizer 205 by signal IM1 from controller 305. Counter 730 was initially cleared to its zero state by signal IJO. The $j_t=0$ signal from counter 730 and the WID write pulse from controller 805 causes the recognized word identification code $I^1$ from latch 212 to be inserted into store 230 in location $m_tj0$ (operation box 1015). Counter 730 is then successively incremented from 1 to 12 in synchronism with the appearance of the $X_{Ij}$ correspondence signals from processor 210 by signal IJ1 from controller 805 (index boxes 1020 and 1030). The correspondence signals are thereby successively inserted into the $m_t$ location of store 230 by write pulses WID from controller 805 (operation box 1025). After the correspondence signals for the $m^{th}$ recognized word are placed in store 230, counter 720 is incremented by control signal IM1 and the distance signals for the next recognized word are processed (index box 1040 and decision box 1045). The storage of the distance signals is indicated by the loop including operation box 1025, index box 1030, and decision box 1035.

After the $M^{th}$ recognized word's correspondence signals have been placed in store 230, controller 805 produces an EI1 ending pulse (operation box 1045). The EI1 ending pulse then initiates the operation of identification processing controller 807. During the identification processing mode, the $\hat{T}_{Ij}$ correspondence signals from store 230 for the successive recognized words are compared with the $\hat{R}_{Ijk}$ correspondence signal for all speakers to ditect the identified speaker with the closest correspondence. The identified speaker's threshold signals are utilized to verify that the unknown speaker to selected identified speaker correspondence is within prescribed statistical limits.

Figure 11:
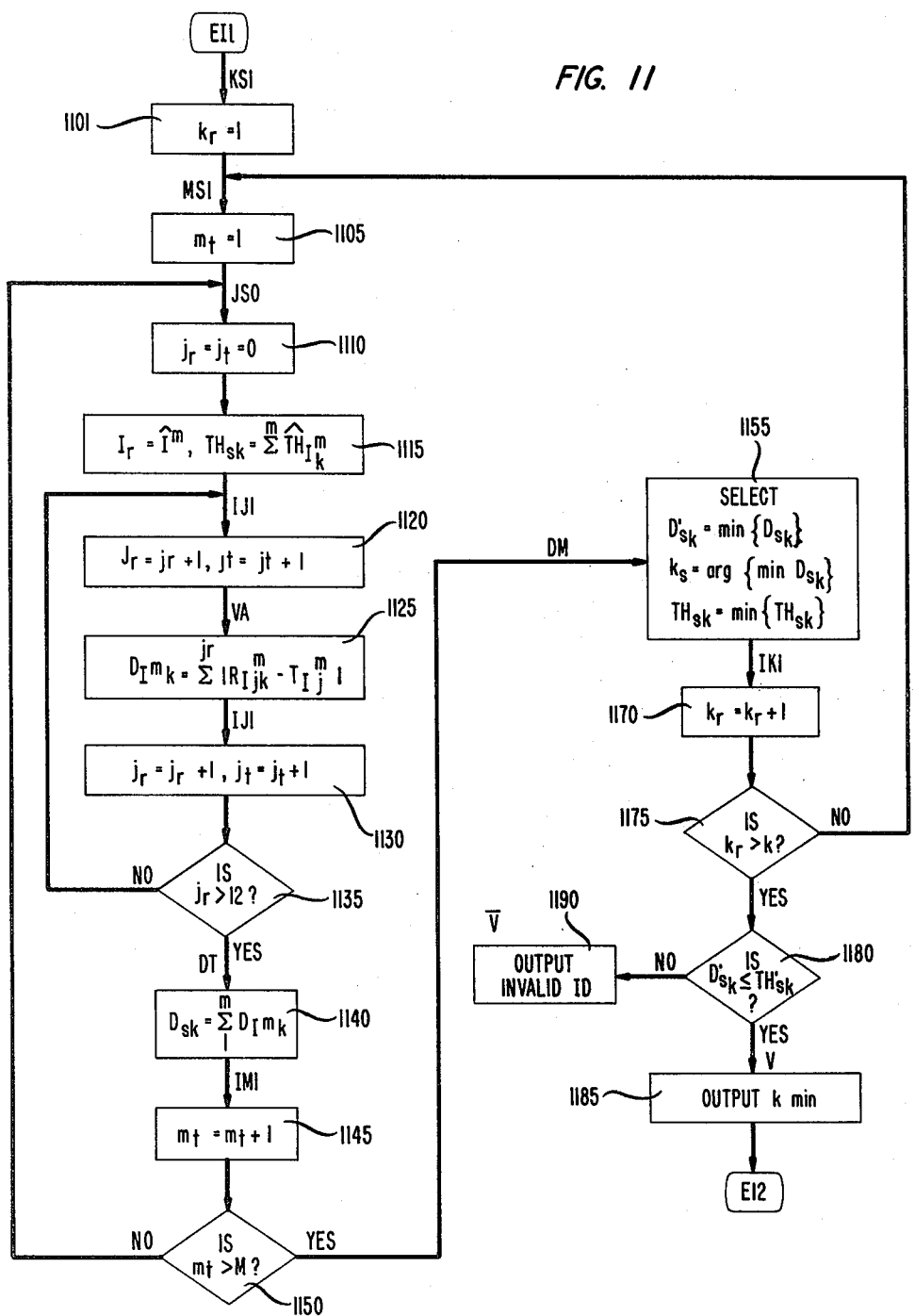

Upon storage of the $X_{Ij}$ correspondence signals for the final recognized word $I^M$ in store 230, controller 807 generates control pulses KS1, MS1, and JS0 so that counters 715, 720, and 730 are reset (index boxes 1101, 1105, and 1110 of FIG. 11). In this way, the recognized word identification signal for the first word $\hat{I}^1(m_t=1)$ appears at the output of store 230. At this time, selector 705 and 710 are adapted to connect their zero inputs to their outputs by signal ID from input device 801. Recognized word identification signal $\hat{I}^1$ from store 230 in thereby applied to the $I_r$ address input of store 220 via selector 710. Counter 701 was initially reset to its first state by signal KS1 (index box 1101). Consequently, the correspondence and threshold signals of the first recognized word of the first identified speaker ($k_r=1$) in store 220 are addressed.

Counter 715 has been cleared to its zero state and the $j_r=0$ signal therefrom accesses the stored-threshold signal $\hat{TH}_{Ik}$ for speaker $k_r=1$ and identified word $\hat{I}^1$ (operation box 1115). The $TH_{I11}$ signal is applied to threshold accumulator 252 wherein it is temporarily stored. Counters 715 and 730 are then incremented by signal IJ1 (operation box 1120) whereby the correspondence signal $\hat{R}_{I11}$ is supplied to one input of PLA arithmetic unit 240. At this time, the first correspondence signal for recognized word $\hat{I}^1$, $\hat{T}_{I11}$ is supplied to the other input of PLA arithmetic unit 240.

Signal $\hat{R}_{I11}$ is representative of the correspondence of the first template for word $\hat{I}^1$ in reference word template store 206 with the first speaker's average utterance of recognized word $\hat{I}^1$. Similarly, $T_{I11}$ is representative of the correspondence of the first reference template for word $\hat{I}^1$ in store 206 with the unknown speaker's utterance of word $\hat{I}^1$. The absolute value of the difference between signals $\hat{R}_{I11}$ and $\hat{T}_{I1}$ provides a partial indication of the identification of the unknown speaker.

PLA arithmetic unit 240 is shown in greater detail in FIG. 8. Referring to FIG. 8, program logic array 801 receives the $\hat{R}_{Ijk}$ signals from identified speaker correspondence store 220 and the $\hat{T}_{Ij}$ signals from input speaker correspondence store 230 and is adapted to form a signal corresponding to the absolute value of the difference therebetween in accordance Equation 5. PLA circuit 801 may be the Signetics integrated circuit type 82S100N or other PLA circuit well known in the art. As aforementioned, the correspondence signals $\hat{R}_{Ijk}$ and $\hat{T}_{Ij}$ are quantized normalized signals which are coded. The codes, however, do not represent the numerical values of the correspondence signals. As is well known in the art, the programmed logic array is adapted to form a prescribed code responsive to the inputs thereof. In FIG. 8, PLA circuit 801 forms a code representative of the absolute value of the numerical difference between the $\hat{R}_{Ijk}$ and $\hat{T}_{Ij}$ codes applied thereto (operation box 1125).

Latch 810 in FIG. 8 was initially cleared by control pulse GR. The PLA output representative of the absolute difference between the $\hat{R}_{I11}$ and $\hat{T}_{I1}$ signals are inserted into latch 810 via Adder 805. After the difference signal is placed in latch 810 (operation box 1125), counters 715 and 730 in FIG. 7 are incremented by control pulse IJ1 (operation box 1130) whereby the second correspondence signals $\hat{R}_{I21}$ and $\hat{T}_{12}$ are obtained from stores 220 and 230. The absolute value numerical difference signal for these correspondence signals from PLA circuit 801 are added to the output of latch 810 in Adder 805 and the resulting sum is placed in latch 810. Counters 715 and 730 are successively incremented by sequence of IJ1 signals, (index box 1130, decision box 1135) so that the signal $\hat{R}_{I131} - \hat{T}_{I13}$ is formed in PLA arithmetic unit 240. The loop including operation box 1125, index box 1130 and decision box 1135 is iteratively processed until the j=12 sum signal is formed. Signal $$D_{I11} = \sum_{j=1}^{12} |\hat{R}_{Ijk} - \hat{T}_{Ij}|$$

at the output of latch 810 is representative of the distance between the correspondence signals $R_{Ijk}$ and $T_{Ij}$ for the first identified word. This $D_{I11}$ signal is placed in correspondence signal accumulator 230 (operation box 1140) by signal DT from controller 807.

Counter 720 in FIG. 7 is then incremented by control pulse IM1 (operation box 1145) and counters 715 and 730 are cleared to their zero states by control pulse JS0 (operation box 1110). Consequently, the second word signals in store 230 are addressed. The second word identification signal $\hat{I}^2$ from store 230 is transferred via memory address generator 280 to the $I_r$ address input of identified speaker correspondence store 220 and the threshold signal $T_{I21}$ for the second identified word is supplied to threshold accumulator 252. The threshold accumulator is operative to sum the signals $\hat{TH}_{I11}$ and $\hat{TH}_{I12}$ as is well known in the art (operation box 1115). Counters 715 and 730 are successively incremented by control pulses IJ1 and the signal $$D_{I21} = \sum_{j=1}^{12} |\hat{R}_{I2j1} - \hat{T}_{I2j}|$$

for the second recognized word is formed in PLA arithmetic unit 240 in the loop including index box 1120, operation box 1125, index box 1130, and decision box 1135. After counters 715 and 730 are placed in their twelfth state (decision box 1235), the correspondence signal $D_{I21}$ for the second word is transferred from latch 810 to correspondence signal accumulator 250 by control pulse DT. The sum of the first and second word signals is formed in the correspondence signal accumulator (operation box 1140).

As described with respect to the first and second identified words of the unknown speaker, the circuit of FIG. 2 is operative to form a distance signal $D_{Im1}$ for each of the remaining identified words. Upon transfer of the $D_{I121}$ from PLA arithmetic unit 240 to correspondence signal accumulator 250, the signal $$D_{s1} = \sum_{m=1}^{M} D_{Im1}$$

is formed in the correspondence signal accumulator (operation box 1140). Signal $D_{s1}$ is then transferred from accumulator 250 to minimum signal selector 260 by signal DM which was previously reset to its largest state by control pulse GR. Consequently, signal $D_{s1}$ is stored in selector 260 and the k=1 speaker identification signal is placed in identification store 262 (operation box 1155). The accumulated threshold signal $$TH_{s1} = \sum_{m=1}^{M} TH_{Im1}$$

in threshold accumulator 252 is placed in latch 254 when signal $D_{s1}$ is determined to be the smallest overall distance signal by minimum signal selector 260 (operation box 1155).

Upon completion of the operation of selector 260, counter 701 in FIG. 7 is incremented to its k=2 state by control pulse IK1 (index box 1170) and the second speaker's characteristics are addressed in identified speaker correspondence store 220. Counter 720 is cleared to its first state $m_t=1$ by control pulse MS1 (operation box 1105) so that the first identified word position in store 230 is again addressed. Counters 715 and 730 are cleared to their zero states by control pulse JS0 (operation box 1110) and signal $I^1$ representative of the first recognized word is obtained from store 230. In this manner, the formation of the overall distance signal $D_{s2}$ and the cumulative threshold signal $\hat{TH}_{s2}$ is initiated.

When the second speaker processing is completed, the overall distance processing for speaker k=2, signal $D_{s2}$ is supplied to minimum signal selector 260. The selector is operative to store the lower valued overall distance signal of signals $D_{s1}$ and $D_{s2}$. In the event signal $D_{s2}$ is stored in selector 260, the cumulative threshold signal $\hat{TH}_{s2}$ is placed in latch 254 and $k_s=2$ is placed in store 262. After the last identified speaker's correspondence signals have been processed in accordance with the flow diagram of FIG. 11, minimum selector 260 contains the $D_{skmin}$ signal. Store 262 contains the identity of the best matching identified speaker $k_s$ and latch 254 contains the threshold signal representative of the acceptable distance range for $D_{skmin}$. The $TH'_{skmin}$ signal from latch 264 is multiplied by a constant adjustment factor F in multiplier 263 and the resultant is compared to the $D_{skmin}$ signal from selector 260 (decision box 1180). If $D_{skmin} \leq (TH'_{skmin})F$, box 1185 is entered and signal V is enabled. The $k_s$ signal is then valid. Otherwise, box 1190 is entered and signal V is not enabled indicating that the identification is invalid.

In the event the $k_s$ signal is verified as being within the acceptable range, the $k=k_s$ speaker's threshold signal in store 220 is updated to reflect a better estimate. This is done in threshold generator 215 shown in detail in FIG. 13 in accordance with the flow diagram of FIG. 12. During the identification processing mode, the threshold signal $\hat{TH}_{Imk}$ being applied to threshold accumulator 252 of FIG. 2 are also inserted into section 1301-2 of FIFO store 1301. The $I^m$ signals identifying the recognized words are simultaneously placed in section 1301 of FIFO store and the $D_{Imk}$ signals from the output of PLA arithmetic unit 240 are put into section 1303-3 of the FIFO store. These signals are successively entered responsive to control pulses LD. FIFO store 1301 may comprise the Western Digital type FR1502E integrated circuit.

Figure 12:
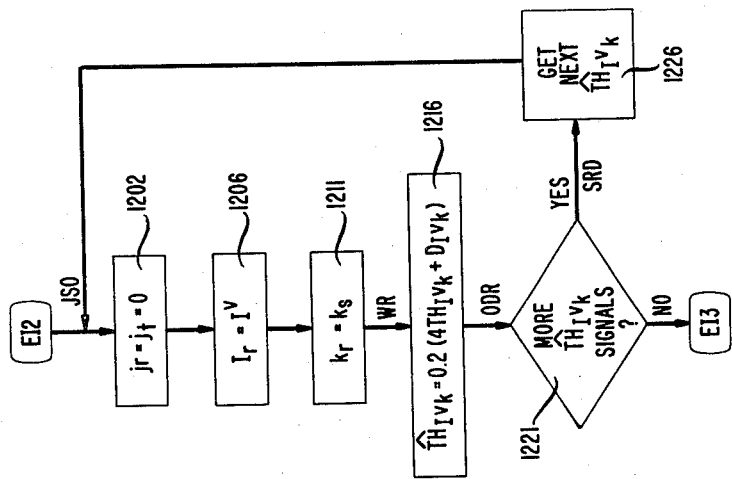
FIGS. 9–12 show flow diagrams illustrating the speaker identification process of the invention.

After verification is completed in comparator 264, counters 715 and 730 are reset to their zero states by signal JS0 (index box 1202 in FIG. 12). The first recognized word identification signal $I^v$ from FIFO section 1301-1 is supplied to the $I_r$ address input of store 220 via selector 710 in memory address generator 280 (box 1206). The $k_s$ identification signal from store 262 is supplied as the $k_r$ address signal to store 220 via selector 705. Thus, the $I_v,k_s$,O location of store 220 is addressed.

The threshold signal $TH_{Ivk}$ from FIFO section 1301-2 is multiplied by 4 in circuit 1305. The signal $D_{Ivk}+4$ $TH_{Ivk}$ is formed in Adder 1310. The resultant out of multiplier 1315 is placed in the $I_v,k_s$,O location of store 220 to replace the former threshold signal therein by write pulse WR from controller 807 as per operation box 1216. Decision box 1221 is entered. If there are more threshold signals to be processed in FIFO 1301, the loop including boxes 1226, 1206, 1211, 1216, and 1221 is reentered. In this manner, the adapted threshold signals for the recognized words of the validated speaker are available in future identification operations. When the FIFO is found to be empty in decision box 1221, the identification mode is terminated by the generation of signal EI3 in controller 807.

Figure 14:
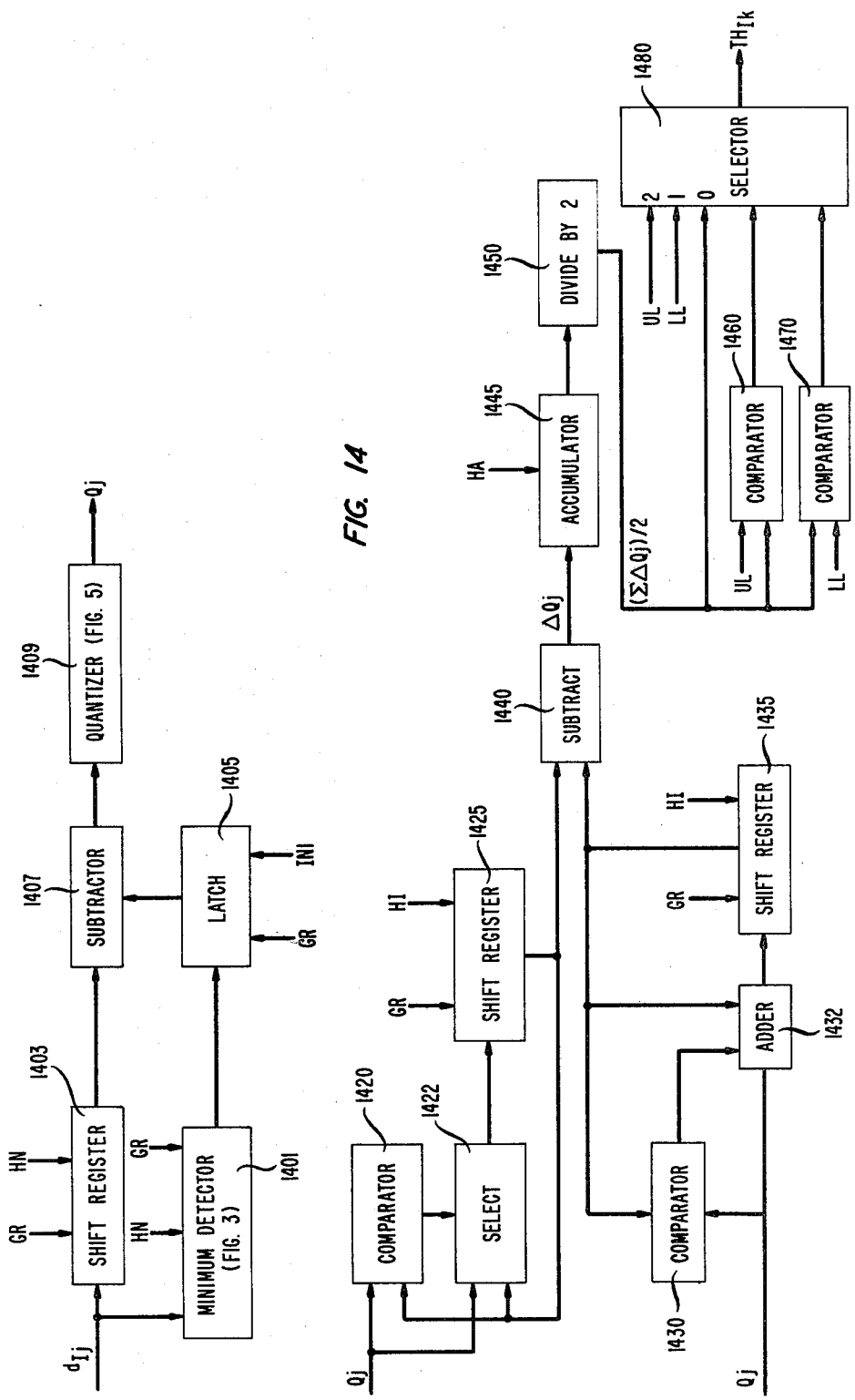
FIG. 14 shows a detailed block diagram of an initial threshold generation circuit that may be used in the circuit of FIG. 2.
Figure 15:
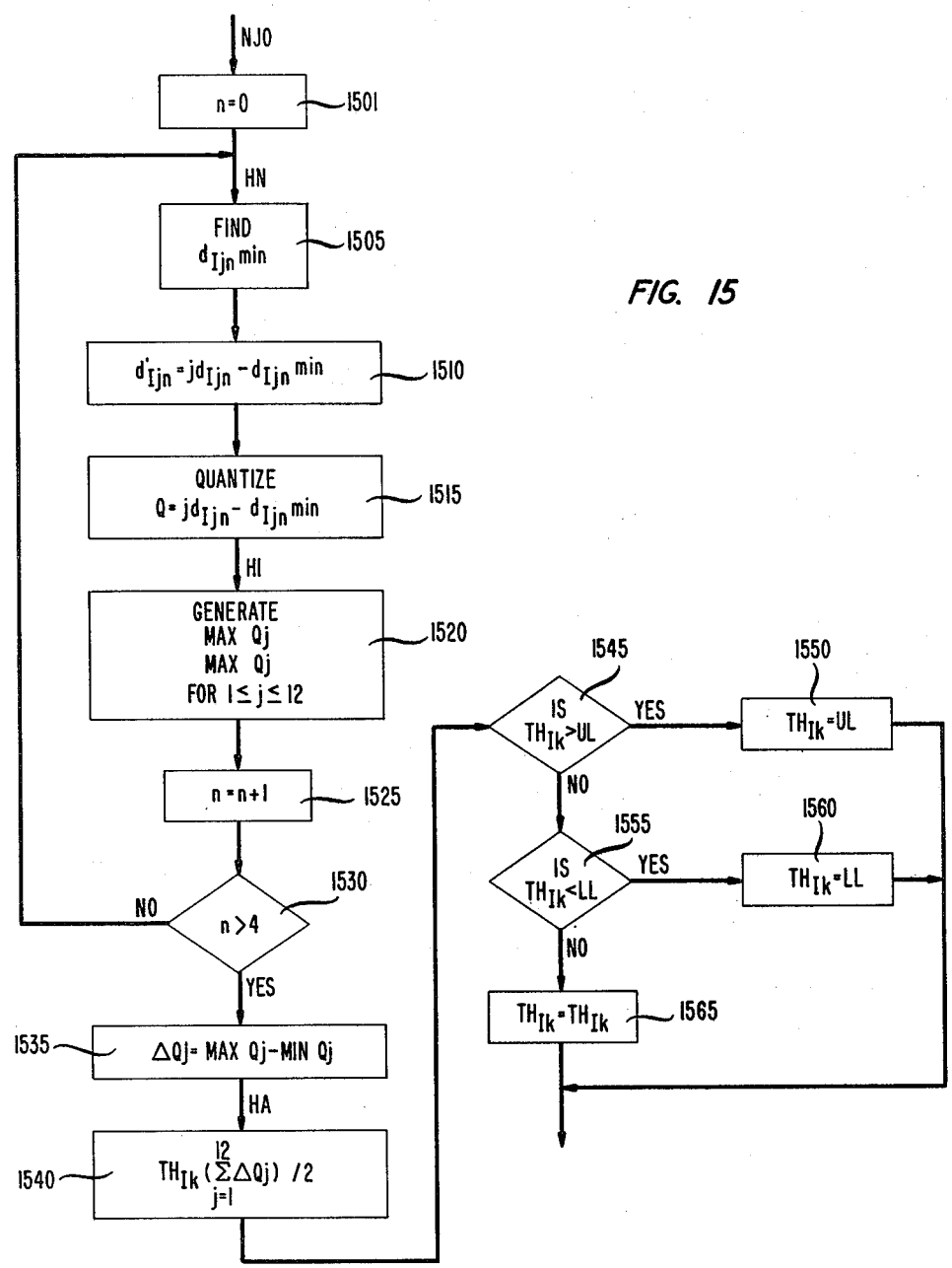
FIG. 15 shows a flow diagram illustrating the initial threshold generation process for FIG. 14.

The circuit of FIG. 14 may be used to generate the initial threshold signals $TH_{Ik}$ in accordance with box 940. The flow diagram of FIG. 15 shows the threshold signal formation of box 940 in greater detail. Referring to FIG. 14, the distance signals $d_{Ij}$ from recognizer 205 are supplied to 12 stage shift register 1403 and to minimum detctor 1401 (FIG. 3) during the training mode. Shift register 1403, and latch 1405 were previously reset to zero by control signal GR from train controller 803. Quantizer 1409 may be the quantizer circuit of FIG. 5. Counter 501 in FIG. 5 is set to zero by pulse NJ0 as per operation box 1501. Minimum detector 1401 is operative to determine the $d_{Ijnmin}$ for each of the 5 set of $d_{Ijn}$ signals. After the $d_{Ijnmin}$ signal for a set is placed into latch 1405 by control signal IN1, subtractor 1407 is operative to form the normalized distance signals $d'_{Ijn}$ as per operation box 1510. The $d'_{Ijn}$ signals are quantized in Quantizer 1409 as previously described with respect to FIG. 5 and the output signals therefrom $Q_j$ are supplied to comparators 1420 and 1430.

Each stage of 12 stage shift register 1425 is initially set to a largest possible values. The sequence of $Q_1, Q_2, \ldots Q_{12}$ signals are supplied to comparator 1420 and shift register 1425 is shifted in synchronism with the $Q_j$ signals. Comparator 1420 is enabled if the $Q_j$ signal is less than the corresponding value in shift register 1425. Since each of the first set of $Q_j$ signals is less than the largest possible value code in the shift register, the output of comparator 1420 transfers the $Q_j$ signal into shift register 1425. As per operation box 1520, the circuit including comparator 1420, selector 1422 and shift register 1425 is operative to determined and store the min quantized signal for $1 \leq j \leq 12$. Each stage of 12 stage shift register 1435 was initially set to zero by control signal GR in the train mode. Comparator 1430 is enabled when a quantized normalized distance signal from quantizer 1409 is greater than the value in the corresponding stage of register 1435. Selector 1432 is enabled by the output of comparator 1430 and the greater value of the $Q_1$ signal and the corresponding stage of shift register 1435 is transferred into the shift register (operation box 1520). After each set of $d_{Ij}$ signals is processed, an IP1 signal is obtained from controller 803. In this manner, a set of $minQ_1, minQ_2, \ldots, minQ_{12}$ and $maxQ_1, \ldots, maxQ_{12}$ are selected and stored in shift registers 1425 and 1435, respectively.

Upon completion of the operation of the loop including boxes 1505, 1510, 1515, 1520, 1525, and 1530, the successive outputs of shift registers 1425 and 1435 are supplied to subtractor 1440. The $\Delta Q_j$ signal set is formed (operation box 1535) in the subtractor. The outputs of subtractor 1440 $\Delta Q_1, \Delta Q_2, \ldots \Delta Q_{12}$ are summed in accumulator 1445. The signal $$\sum_{j=1}^{12} \Delta Q_j$$

is divided by 2 in circuit 1450 whereby the initial threshold $TH_{Ikm}$ for speaker $k_m$ is obtained. This threshold signal, however, may not be within the statistically prescribed range for the general population. Therefore, signal $TH_{Ik}$ is compared to an upper range limit signal UL and a lower range limit signal LL. This is done in comparators 1460 and 1470. Where $TH_{Ik}$ is greater than LL and less than UL, neither comparator is enabled. Selector 1480 then connects its 0 input to its output and signal $TH_{IkM}$ is placed in the $I, k_{m1}, jr = 0$ location of store 220. In the event that $TH_{Ik} \geq UL$, the selector 480 transfers the upper range limit signal UL to store 220. Similarly, if $TH_{IkM} \leq LL$, selector 1480 transfers the LL signal to store 220. The composition operations are shown in decision boxes 1545 and 1555 and boxes 1550, 1560 and 1565 in FIG. 15.

While the invention has been shown and described with reference to particular illustrative embodiments, it is to be understood that modifications and changes may be made by those skilled in the art without departing from the scope and spirit of the invention.

APPENDIX A

```
       C       TRAINING MODE
       C       INITIAL RESET
               OUTC (ERT)
               N = 5
               OUTP (GR,JS0,NS0)
               OUTP (RW)
1000           INL (RE)
               IF (RE .EQ. 0) GO TO 1000
       C       FIRST WORD RECOGNIZED
       C       DSP STATE 1
               WAIT (1)
               DO 1010 JA = 1,12,1
               WAIT (1)
               OUTP (IJ1,HN)
1010           CONTINUE
               WAIT (1)
               OUTP (IN1)
               N = N-1
               WAIT (2)
       C       AVERAGE WORDS 2 TO N
       C       DSP STATE 2
               DO 1030 JB = 1,N
               OUTP (RW)
1011           INL (RE)
               IF (RE .EQ. 0) GO TO 1011
               DO 1020 JC = 1,12,1
               WAIT (1)
               OUTP (IJ1,HN,HI)
1020           CONTINUE
               WAIT (1)
               OUTP (IN1)
               WAIT (3)
1030           CONTINUE
       C       GENERATE MEAN DISTANCE
       C       DSP STATE 3
               DO 1040 JD = 1,12,1
               WAIT (1)
               OUTP (HN,HI)
1040           CONTINUE
               DO 1045 JE = 1,12,1
               WAIT (1)
               OUTP (HI,HA)
1045           CONTINUE
       C       TRANSFER TO REF MEMORY
       C       DSP STATE 4
               OUTP (JS0)
               OUTP (IS1,WTR)
```

APPENDIX A-continued

```
               DO 1050 JF = 1,12,1
               OUTP (IJ1,WTR)
               WAIT (1)
1050           CONTINUE
               OUTS (ETR)
               STOP
       C       IDENTIFICATION MODE
       C       INITIAL RESET
               OUTC (EI2)
               M = 9
               OUTP (GR,NS1,MS1)
2000           OUTP (JS0)
               OUTP (RW)
2001           INL (RE)
               IF (RE .EQ. 0) GO TO 2001
       C       WORD RECOGNIZED
       C       DSP STATE 1
               WAIT (1)
               DO 2010 JF = 1,12,1
               WAIT (1)
               OUTP (IJ1)
2010           CONTINUE
       C       TRANSFER TO TEST MEMORY
       C       DSP STATE 4
               OUTP (JS0,WID)
               WAIT (1)
               DO 2020 JG = 1,12,1
               OUTP (IJ1,WID)
               WAIT (1)
2020           CONTINUE
               OUTP (IM1)
               M = M - 1
               IF (M .NE. 0) GO TO 2000
               OUTS (EI1)
       C       VERIFY MODE
               OUTC (EI1)
               K = 50
               M = 9
               OUTP (KS1,MS1)
3000           OUTP (JS0)
               WAIT (1)
               OUTP (VT)
               DO 3010 JH = 1,12,1
               OUTP (VA,IJ1)
               WAIT (1)
3010           CONTINUE
               OUTP (DT)
               OUTP (IM1)
               M = M - 1
               IF (M .NE. 0) GO TO 3000
               M = 9
               OUTP (DM)
               OUTP (IK1)
               K = K - 1
               IF (K .NE. 0) GO TO 3000
               INL (V)
               IF (V .EQ. 1A) GO TO 4000
       C       SPEAKER NOT VERIFIED
               OUTS (EI2)
               STOP
       C       SPEAKER VERIFIED
       C       ADAPT MODE
4000           OUTP (JS0)
4001           INL (ODR)
               IF (ODR .EQ. 0) GO TO 4010
               OUTP (WTR)
               WAIT (3)
               OUTP (SRD)
               WAIT (3)
               GO TO 4001
       C       ADAPTION COMPLETE
4010           OUTS (EI2)
               STOP
               END
```

What is claimed is:

1. A method for recognizing a speaker comprising the scope of storing a set of templates representative of the acoustic features of predetermined reference words; generating, for each of a plurality of identified speakers, a set of first signals representative of the correspondence of the identified speaker's utterance of said reference words with said templates; generating a set of signals representative of the acoustic features of the utterance of an unknown speaker; recognizing the words of the unknown speaker's utterance from his utterance feature signals and said templates; generating a set of second signals representative of the correspondence of the feature signals of the recognized words of the unknown speaker to the feature signals of the templates; and identifying the unknown speaker responsive to the first signals for the recognized words of the identified speakers and the second signals.

2. A method for recognizing a speaker according to claim 1 wherein the template storing step comprises storing a plurality of templates for each reference word, each template being representative of a distinct group of speakers, said first signal generating step comprises generating a set of signals each representative of the correspondence of the identified speaker's utterance of one of said reference words with each distinct group template; said second signal generating step comprises generating a set of signals each representative of the correspondence of the unknown speaker's feature signals for said recognized words with the feature signals of each distinct group template for said recognized words; and said identifying step comprises comparing the distinct group template correspondence signals for the recognized words of the identified speakers with the distinct group template correspondence signals for the unknown speaker to select the identity of the unknown speaker.

3. A method for recognizing a speaker according to claim 2 wherein said distinct group template correspondence signal generation comprises detecting the minimum distinct group template correspondence signal, and forming a normalized correspondence signal for each distinct group correspondence signal responsive to the distinct group correspondence signal and the detected minimum distinct group correspondence signal.

4. A method for recognizing a speaker according to claim 3 wherein said distinct group correspondence signal forming step further comprises; generating a set of quantizing threshold signals; and quantizing each normalized correspondence signal responsive to said quantizing threshold signals.

5. A method for recognizing a speaker according to claim 4 wherein said comparing step comprises; generating for each identified speaker and each recognized word a signal representative of the differences between the quantized normalized correspondence signals of the identified speaker and the quantized normalized correspondence signals of the unknown speaker, and recognizing the unknown speaker as one of the identified speakers responsive to said difference signals.

6. A method for recognizing a speaker according to claim 5
further comprising
generating a signal for each identified speaker representative of the accpetable deviation from the first correspondence signals for said identified speaker and said comparing step further comprises verifying the determined identity responsive to said difference signals and the acceptable deviation signal for said determined identity.

7. A method for recognizing a speaker according to claim 6 wherein said acceptable deviation signal generation comprises generating a set of signals each representative of the variations of the quantized normalized correspondence signals of each identified speaker responsive to the quantized normalized correspondence signals of the identified speaker and combining said variation representative signals to form an identified speaker threshold signal.

8. A method for recognizing a speaker according to claims 2, 3, or 4 further comprising; generating a signal representative of the asserted identity of the unknown speaker; and a speaker threshold signal representative of the acceptable differences between the first and second signals; said comparing step comprises comparing the distinct group template correspondence signals for the recognized words of the asserted identified speaker with the distinct group template correspondence signals of the unknown speaker to produce an identity correspondence signal; and verifying the asserted identity responsive to said identity correspondence signal and said speaker threshold signal.

9. A method for recognizing the identity of a speaker comprising the steps of storing a set of templates each representative of the acoustic features of a reference word for a distinct group of speakers; generating for each of a plurality of identified speakers a set of first signals each representative of the correspondence of the identified speaker's utterance of said reference words with said templates for said reference words; generating a set of signals representative of the acoustic features of an utterance by an unknown speaker; recognizing the words of the utterance of said unknown speaker from the utterance feature signals and said templates; generating a set of second signals representative of the correspondence of the feature signals of the recognized words of the unknown speaker to the feature signals of said templates; comparing said first correspondence signals for the recognized words of each identified speaker to the second correspondence signals to identify the unknown speaker as the identified speaker having the closest matching correspondence signals.

10. Apparatus for recognizing a speaker comprising; means for storing a set of templates representative of the acoustic features of predetermined reference words; means responsive to the identified speaker's utterance and said templates for generating a set of first signals representative of the correspondence of the identified speaker's utterance of said reference words with said templates for each of a plurality of identified speakers; means for generating a set of signals representative of the acoustic features of the utterance of an unknown speaker; means responsive to the unknown speaker's utterance feature signals and said templates for recognizing the words of the unknown speaker's utterance; means responsive to the feature signals of the recognized words of the unknown speaker and the feature signals of said templates for generating a set of second signals representative of the correspondence of the recognized words of the unknown speaker with the templates for the recognized words; and means responsive to the first signals for the recognized words of the identified speakers and the second signals for identifying the unknown speaker.

11. Apparatus for recognizing a speaker according to claim 10 wherein the template storing means comprises; means for storing a plurality of templates for each reference word, each template being representative of a distinct group of speakers, said first signal generating means comprises means for producing a set of signals each representative of the correspondence of the identified speaker's utterance of one of said reference word with each distinct group template of said reference word; said second signal generating means comprises means for generating a set of signals each representative of the correspondence of the unknown speaker's feature signals for said recognized words with the feature signals of each distinct group template for said recognized words; and said identifying means comprises means for comparing the distinct group template correspondence signals for the recognized words of the identified speakers with the distinct group template correspondence signals for the unknown speaker to select an identity for the unknown speaker.

12. Apparatus for recognizing a speaker according to claim 11 wherein said distinct group template correspondence signal generating means comprises; means for detecting the minimum distinct group template correspondence signal for each reference word and means responsive to the distinct group correspondence signals and the detected minimum distinct group correspondence signal for forming a normalized correspondence signal for each distinct group correspondence signal.

13. Apparatus for recognizing a speaker according to claim 12 wherein said distinct group correspondence signal forming means further comprises; means for generating a set of quantizing threshold signals and means responsive to said quantizing threshold signals for quantizing each normalized correspondence signal.

14. Apparatus for recognizing a speaker according to claim 13 wherein said comparing means comprises; means for generating for each identified speaker and each recognized word a signal representative of the differences between quantized normalized correspondence signals of the identified speaker and the quantized normalized correspondence signals of the unknown speaker and means responsive to said difference signals for identifying the unknown speaker.

15. Apparatus for recognizing a speaker according to claim 14 further comprising
  means responsive to the utterance of each identified speaker and said template feature signals of each identified speaker for generating a signal representative of the acceptable deviation from the first correspondence signals for said identified speaker;
  and said comprising means further comprises means responsive to said difference representative signals and said acceptable deviation signal for the determined identity for verifying the determined identity as being within acceptable limits.

16. Apparatus for recognizing a speaker according to claim 15 wherein said acceptable deviation signal generating means comprises means responsive to the quantized normalized correspondence signals of the identified speaker for generating a set of signals representative of the variations of the identified speaker's quantized normalized correspondence signals; and means for combining said variation representative signals to form an identified speaker threshold signal.

17. Apparatus for recognizing a speaker according to claims 11, 12, or 13 further comprising; means for generating a signal representative of the asserted identity of the unknown speaker, and means for generating a speaker threshold signal representative of the acceptable differences between the first and second signals, said comparing means comprises; means for comparing the distinct group template correspondence signals for the recognized words of the asserted identified speaker with the distinct group template signals of the unknown speaker to produce an identity correspondence signal and means responsive to the identity correspondence signal and said speaker threshold signal for verifying the asserted identity of the unknown speaker.

* * * * *

UNITED STATES PATENT AND TRADEMARK OFFICE
CERTIFICATE OF CORRECTION

PATENT NO. : 4,363,102

DATED : December 7, 1982

INVENTOR(S) : John E. Holmgren, Aaron E. Rosenberg, and John W. Upton

It is certified that error appears in the above-identified patent and that said Letters Patent is hereby corrected as shown below:

In column 3, line 32, "production" should read --prediction--. Column 4, line 14, "R" should read --$\bar{R}$--. Column 5, line 51, "M a" should read --$\bar{M}$--. Column 11, line 16, "in" should read --is--; line 37, "T" should read --$\hat{T}$--. Column 12, line 33, "$\hat{T}H$" should read --$T\hat{H}$--; line 34, "$\hat{T}H$" should read --$T\hat{H}$--. Column 13, line 20, "I" should read --$\hat{I}$--. Column 14, line 58, "$Q_1$" should read --$Q_j$--. Column 15, line 17, "$I,k_{ml}jr=0$" should read --$I,k_{ml},jr=0$--; line 22, "composition" should read --comparison--. Column 16, line 66, "scope" should read --steps--.

Signed and Sealed this

Twentieth Day of December 1983

[SEAL]

Attest:

GERALD J. MOSSINGHOFF

Attesting Officer    Commissioner of Patents and Trademarks